(12) United States Patent
Giralte

(10) Patent No.: US 11,968,177 B2
(45) Date of Patent: Apr. 23, 2024

(54) SYSTEMS AND METHODS FOR VERIFYING A FIREWALL FOR A CLOUD PROVIDER

(71) Applicant: Salesforce, Inc., San Francisco, CA (US)

(72) Inventor: Luis Campo Giralte, Dublin (IE)

(73) Assignee: Salesforce, Inc., San Francisco, CA (US)

( * ) Notice: Subject to any disclaimer, the term of this patent is extended or adjusted under 35 U.S.C. 154(b) by 247 days.

(21) Appl. No.: 17/457,361

(22) Filed: Dec. 2, 2021

(65) Prior Publication Data

US 2023/0179569 A1 Jun. 8, 2023

(51) Int. Cl.
*H04L 9/40* (2022.01)
*G06F 16/83* (2019.01)

(52) U.S. Cl.
CPC .......... *H04L 63/0263* (2013.01); *G06F 16/83* (2019.01); *H04L 63/1416* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |

(Continued)

FOREIGN PATENT DOCUMENTS

| | | | | |
|---|---|---|---|---|
| CN | 114448665 A | * | 5/2022 | |
| WO | WO-2004095204 A2 | * | 11/2004 | ............. H04L 12/58 |
| WO | WO-2014201137 A1 | * | 12/2014 | ............. G06F 17/30 |

OTHER PUBLICATIONS

Hossain et al. "Client-Side Detection of Cross-Site Request Forgery Attacks"—IEEE (Year: 2010).*

*Primary Examiner* — Younes Naji
(74) *Attorney, Agent, or Firm* — Lorenz & Kopf, LLP

(57) ABSTRACT

Systems and methods for verifying a firewall for a cloud provider. The method includes receiving by a timelord module configured with access to a plurality of HTTP attacks that incorporate random tokens, an updated policy ok signal that was generated by an external element. The timelord module responds by (a) loading a first HTTP attack with a first expected response that is either forbidden or accepted, the first HTTP attack including the random tokens in a form of a header key value parameter; (b) sending the first HTTP attack to the firewall; (c) comparing a response from the firewall to the first HTTP attack with the first expected response; and (d) incrementing the first HTTP attack and repeating (a)-(c) until the plurality of HTTP attacks has been sent; and deleting the random tokens after the plurality of HTTP attacks have been sent.

15 Claims, 3 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,279,885 B2 * | 10/2012 | Riddle .................. G06F 9/526 711/170 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,900,156 B2 * | 2/2018 | Tiwari ................... H04L 9/14 |
| 10,044,751 B2 * | 8/2018 | Huston, III ......... H04L 63/1441 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0215721 A1 * | 10/2004 | Szeto ................... H04L 69/08 709/204 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0055375 A1 * | 2/2013 | Cline ................... H04L 63/168 726/13 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2017/0142093 A1 * | 5/2017 | Oelke ................... G06F 13/161 |
| 2020/0145409 A1 * | 5/2020 | Pochuev ............. H04L 63/0876 |
| 2020/0389484 A1 * | 12/2020 | Key ................... H04L 63/1425 |

\* cited by examiner

SYSTEMS AND METHODS FOR VERIFYING A FIREWALL FOR A CLOUD PROVIDER

TECHNICAL FIELD

Embodiments of the subject matter described herein relate generally to database management systems, and more particularly, embodiments of the subject matter relate to verifying a firewall for a cloud provider.

BACKGROUND

Cloud providers, also referred to as application servers, are often subjected to a variety of internet traffic. Much of the internet traffic is in the form of an HTTP request; these requests can include requests for access, requests to obtain data/information, requests to provide data/information, and the like.

In some scenarios, and for a variety of different reasons, the requests may be unacceptable. Regardless of the reason for the request being unacceptable, a technical challenge is presented in creating and maintaining a firewall that securely blocks the unacceptable requests, while passing the acceptable requests. Available firewall solutions often employ a firewall policy that requires identifying an internet protocol (IP) address to make a determination as to the acceptability of the request. However, these firewall solutions are not reliable in all scenarios.

Accordingly, improvements to firewalls are desirable. Furthermore, other desirable features and characteristics of the disclosure will become apparent from the subsequent detailed description and the appended claims, taken in conjunction with the accompanying drawings, brief summary, technical field, and this background of the disclosure.

SUMMARY

Disclosed herein are methods and systems for verifying a firewall for a cloud provider. By way of example, and not limitation, various embodiments are disclosed herein.

In accordance with an aspect of the present disclosure, a system that provides verification of a firewall, comprising: a timelord module in operable communication with the firewall and configured to: generate random tokens responsive to a schedule task; receive an updated policy ok signal from an external element; and respond to the updated policy ok signal by loading a first HTTP attack from among a plurality of HTTP attacks, the first HTTP attack including a first expected response that is either forbidden or accepted and the random tokens in a form of a header key value parameter, sending the first HTTP attack to the firewall, comparing a response from the firewall to the first HTTP attack with the first expected response; and incrementing the first HTTP attack and repeating until the plurality of HTTP attacks has been sent; and the timelord module further configured to delete the random tokens when the plurality of HTTP attacks has been sent.

In accordance with another aspect, processor-implemented method for verifying a firewall, comprising: receiving an updated policy ok signal; responding to the updated policy ok signal by: loading a first HTTP attack with a first expected response that is either forbidden or accepted, the first HTTP attack including random tokens in a form of a header key value parameter; sending the first HTTP attack to the firewall; comparing a response from the firewall to the first HTTP attack with the first expected response; incrementing the first HTTP attack and repeating the loading, sending, and comparing until a plurality of HTTP attacks has been sent; and deleting the random tokens after the plurality of HTTP attacks have been sent.

In accordance with another aspect, provided is at least one non-transitory computer-readable medium containing instructions thereon, which, when executed by at least one processor, are capable of performing a method comprising: receiving an updated policy ok signal; responding to the updated policy ok signal by: loading a first HTTP attack with a first expected response that is either forbidden or accepted, the first HTTP attack including random tokens in a form of a header key value parameter; sending the first HTTP attack to a firewall; comparing a response from the firewall to the first HTTP attack with the first expected response; incrementing the first HTTP attack and repeating the loading, sending, and comparing until a plurality of HTTP attacks has been sent; and deleting the random tokens after the plurality of HTTP attacks have been sent.

The above advantage and other advantages and features of the present disclosure will be apparent from the following detailed description of the preferred embodiments when taken in connection with the accompanying drawings.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The provided systems and methods provide a solution to the technical challenges described above in the form of the firewall verification service. In some implementations, the firewall verification service embodies a firewall verification service; in other implementations, the firewall verification service is incorporated into an existing web application or customer management service.

As described in greater detail below, in one or more implementations, a firewall verification service is employed to verify firewall policies for a web application that is running on the cloud provider. The web application may be one of a plurality of web applications, and the cloud provider may be one of a plurality of cloud providers. Embodiments of the firewall verification service are configured to match a specific web application with its respective firewall, and the associated firewall policies for that firewall. Embodiments are, advantageously, not dependent upon an IP identification to block or pass a request.

Figure 1:
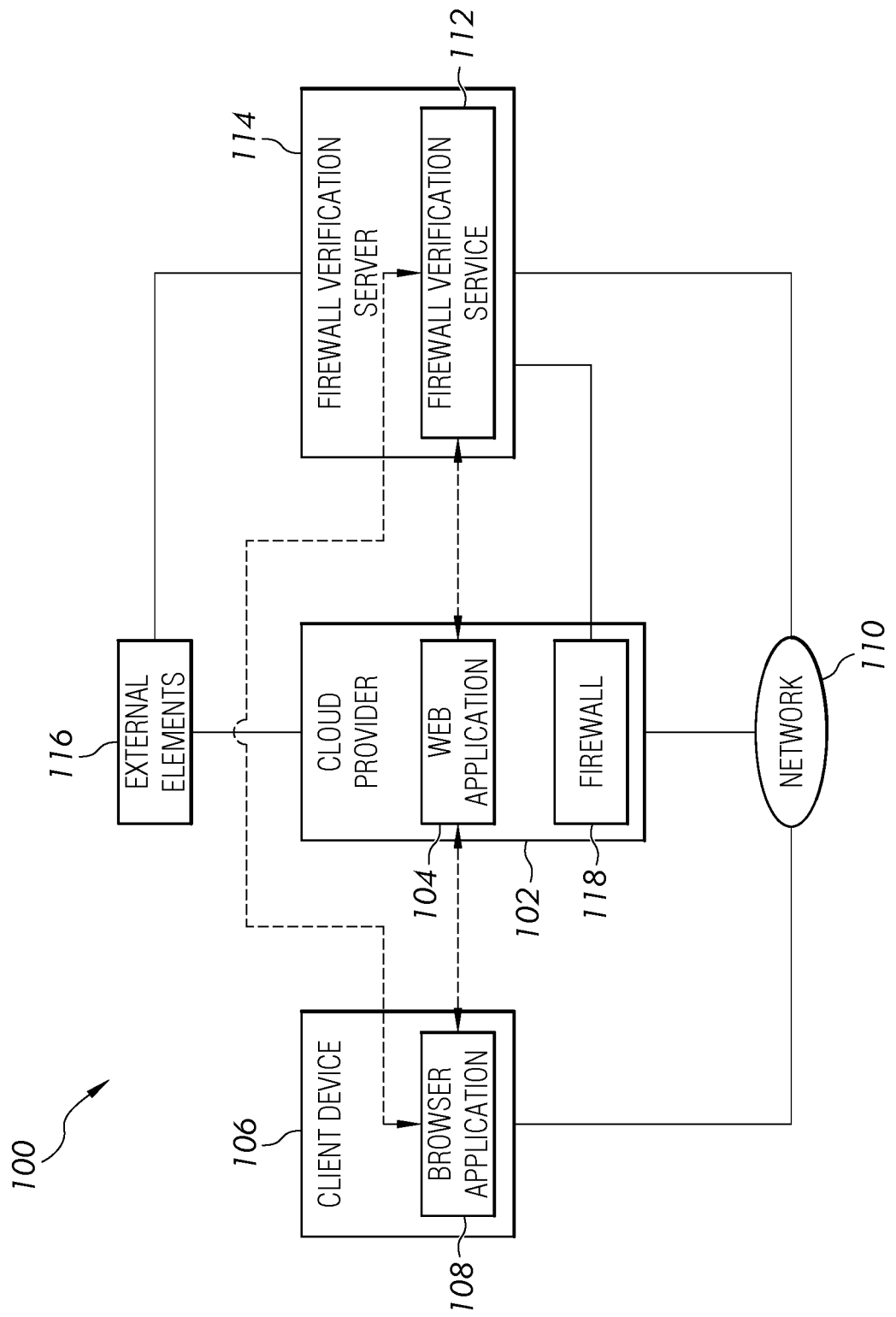
FIG. 1 is a block diagram illustrating a system for verifying a firewall for a cloud provider, according to some example implementations.

FIG. 1 depicts an exemplary system 100 for verifying a firewall for a cloud provider. It should be appreciated that FIG. 1 depicts a simplified representation of the system 100 for purposes of explanation and is not intended to be limiting. The system 100 includes an application server, referred to herein as cloud provider 102, configurable to provide instances of a web application 104 within client applications 108 executed on client devices 106 communicatively coupled to the cloud provider 102 via a communications network 110, such as the Internet or any sort or combination of wired and/or wireless computer network, a cellular network, a mobile broadband network, a radio network, or the like. In one or more implementations, the web application 104 is realized as a virtual application generated at run-time or on-demand.

The firewall 118 is configured to sit, operationally, between the network 110, which is the source for incoming internet traffic (and, hence, HTTP attacks) and the web application 104. Said differently, all internet traffic from the network 110 goes through the firewall 118 first, before it can get to the web application 104. In various embodiments, the firewall 118 is configured with firewall policies that are specific to the web application 104. The web application 104 may utilize a firewall verification service 112, provided by a firewall verification server 114, to assure firewall verification policies are up to date for the firewall.

The client device 106 generally represents an electronic device coupled to the network 110 that may be utilized by a user to access the web application 104 on the cloud provider 102 and utilize the web application 104 to retrieve, view, and/or otherwise access data. In practice, the client device 106 can be realized as any sort of personal computer, mobile telephone, tablet, or other network-enabled electronic device. Additional examples of client devices 106 include wearable devices, smart appliances, and vehicle-based systems or applications. In exemplary embodiments, the client device 106 includes a display device, such as a monitor, screen, or another conventional electronic display, capable of graphically presenting data and/or information provided by the web application 104 along with a user input device, such as a touchscreen, a touch panel, a mouse, a joystick, a directional pad, a motion sensor, or the like, capable of receiving input from the user of the client device 106. The illustrated client device 106 executes or otherwise supports a client application 108 that communicates with the web application 104 on the cloud provider 102 using a networking protocol. In some implementations, the client application 108 is realized as a web browser or similar local client application executed by the client device 106 that contacts the cloud provider 102 and/or the web application 104 using a networking protocol, such as the hypertext transport protocol (HTTP) or the like, to access or otherwise initiate an instance of the web application 104 being presented on the client device 106 (e.g., by or within the client application 108).

The client device 106 may be one or a plurality of client devices, and the browser application 108 may be one or a plurality of browser applications. While the client device 106 is described above as one configured with authority to access the web application 104, generally, a person with skill in the art will understand that in some scenarios, the client device 106 can initiate an unacceptable request, provided via the network 110, to the web application 104 running on the cloud provider 102. Further, in some scenarios, other similar devices, not having access to web application 104, can be in operable communication through the network 110 and may initiate acceptable as well as unacceptable requests to the web application 104 running on the cloud provider 102.

The cloud provider 102 generally represents a server computing device, server computing system or another combination of processing logic, circuitry, hardware, and/or other components configured to support the web application 104 and related authorization processes, tasks, operations, and/or functions described herein. In this regard, the cloud provider 102 generally includes a processing system, which may be implemented using any suitable processing system and/or device, such as, for example, one or more processors, central processing units (CPUs), controllers, microprocessors, microcontrollers, processing cores and/or other hardware computing resources configured to support the operation of the processing system described herein. The processing system may include or otherwise access a data storage element (or memory) capable of storing programming instructions for execution by the processing system, that, when read and executed, are configurable cause processing system to create, generate, or otherwise facilitate an application platform that generates or otherwise provides instances of a web application 104 at run-time (or "on-demand") based at least in part upon code and other data that is stored or otherwise maintained by the memory, a database, or another location on the network 110 and support the authorization processes described herein. Depending on the embodiment, the memory may be realized as a random-access memory (RAM), read only memory (ROM), flash memory, magnetic or optical mass storage, or any other suitable non-transitory short- or long-term data storage or other computer-readable media, and/or any suitable combination thereof.

Figure 2:
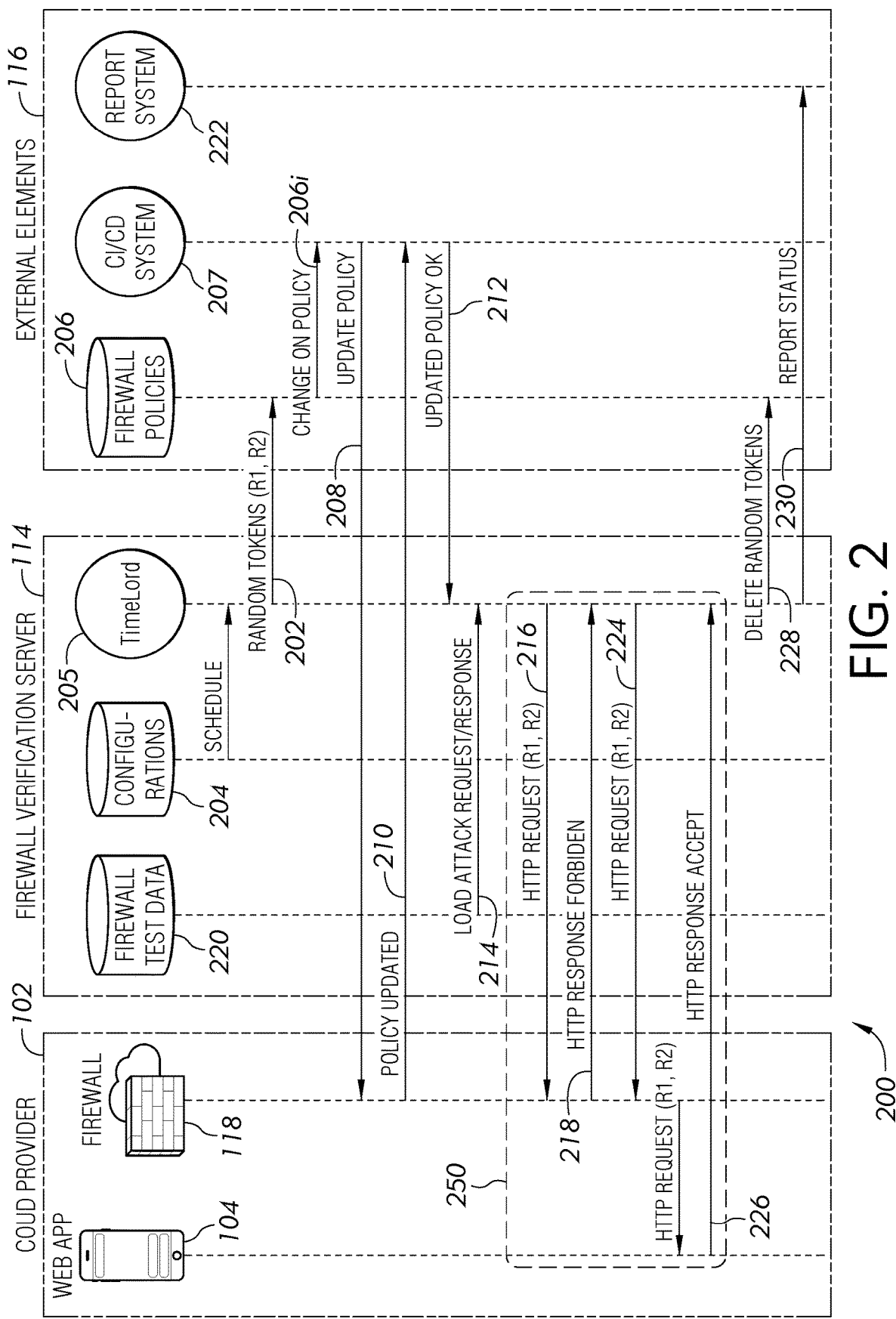
FIG. 2 is a sequence diagram to depict exemplary process 200 steps for a method for verifying a firewall for a cloud provider, according to some example implementations.

Turning now to FIG. 2, and with continued reference to FIG. 1, the firewall verification server 114 generally represents a server computing device, server computing system or another combination of processing logic, circuitry, hardware, and/or other components configured to automatically generate and assign unique human-readable aliases to web applications and support the related authorization processes, tasks, operations, and/or functions described herein. In this regard, the firewall verification server 114 generally includes a processing system (referred to herein as the timelord module 205), which may be implemented using any suitable processing system and/or device, such as, for example, one or more processors, central processing units (CPUs), controllers, microprocessors, microcontrollers, processing cores and/or other hardware computing resources configured to support the operation of the processing system described herein. The timelord module 205 may include or otherwise access a data storage element (or memory) capable of storing programming instructions for execution by the processing system, that, when read and executed, are configurable cause processing system to create, generate, or otherwise facilitate the firewall verification service 112 to provide the firewall verification processes described herein. In various embodiments, the firewall verification server 114 includes a configurations database 204 and a firewall test data database 220, described in more detail below. The configurations database 204 and the firewall test data database 220 are in operable communication with the timelord module 205. The configurations database 204 may store a preprogrammed schedule for generating random tokens; and in some embodiments, the configurations database 204 further stores a plurality of preprogrammed schedules, and additional data, to customize communications and policy updates to specific instances of the web application 104.

In various implementations, the firewall verification server 114 is integrated within the cloud provider 102, such that the firewall verification service 112 is an enhancement to the web application 104.

In the illustrated implementation depicted in FIG. 2, the external element 116 generally includes at least one processing system (such as, but not limited to, a computer interface (CI/CD) system 207 and/or a report system 222), each of which may be implemented using any suitable processing system and/or device, such as, for example, one or more processors, central processing units (CPUs), controllers, microprocessors, microcontrollers, processing cores and/or other hardware computing resources configured to support the operation of the processing system described herein. The external element 116 may include or otherwise access a data storage element (or memory) capable of storing programming instructions for execution by the processing system, that, when read and executed, are configurable cause processing system to create, generate, or otherwise facilitate the tasks and processes comprising the interaction with the firewall verification service 112 as described herein. The external element 116 may also include a firewall policies database 206.

In practice, the external element 116 may be physically and logically distinct from the cloud provider 102 and the firewall verification server 114. In exemplary implementations, components of the external element 116 reside at a different physical location than the cloud provider 102 and are owned, controlled, or otherwise operated by a third-party different from the different parties that own, control and/or operate the cloud provider 102. In some implementations, the firewall verification server 114 is affiliated with the same party that owns, controls and/or operates one or more components of the external element 116, such as the firewall policies database 206. Additionally, in various implementations, the firewall verification server 114 resides at a different physical location than the external element 116 and/or the firewall verification server 114 is owned, controlled, or otherwise operated by another party that is independent and different from the operator of the third-party computing system 120 and the developer operator of the cloud provider 102.

In one or more embodiments, the cloud provider 102 is realized as an on-demand multi-tenant database system that is capable of dynamically creating and supporting virtual applications based upon data shared between multiple tenants, which may alternatively be referred to herein as a multi-tenant database. Data and services generated by the virtual applications may be provided via the network 110 to any number of client devices, as desired. Each virtual application may be suitably generated at run-time (or on-demand) using a common application platform that securely provides access to data in a database for each of the various tenants subscribing to the multi-tenant system. In accordance with one non-limiting example, the cloud provider 102 is implemented as at least part of an on-demand multi-tenant customer relationship management (CRM) system that can support any number of authenticated users of multiple tenants. In this regard, one or more implementations of the cloud provider 102 support one or more application program interfaces (APIs) that allow other web applications 104 and/or cloud providers 102 on the network 110 that have been authorized by the firewall verification service 112 to access and perform operations with respect to individual tenant's data.

FIG. 2 is a sequence diagram to depict exemplary process steps for a method 200 for verifying a firewall 118 for a cloud provider 102 and perform additional tasks, functions, and/or operations described herein. For illustrative purposes, the following description may refer to elements mentioned above in connection with FIG. 1. In this regard, while portions of the method 200 may be performed by different elements of the computing system 100, for purposes of explanation, the subject matter is described herein in the context of the method 200 being primarily performed by a timelord module 205 in a firewall verification service 112 located on a firewall verification server 114. It should be appreciated that the method 200 may include any number of additional or alternative tasks, the tasks need not be performed in the illustrated order and/or the tasks may be performed concurrently, and/or the method 200 may be incorporated into a more comprehensive procedure or process having additional functionality not described in detail herein. Moreover, one or more of the tasks shown and described in the context of FIG. 2 could be omitted from a practical embodiment of the method 200 as long as the intended overall functionality remains intact.

The method 200 initializes or otherwise begins with the timelord 205 waking up as a consequence of a schedule task. The timing of the schedule task is controlled by a preprogrammed schedule in the configurations database 204. Responsive to the schedule command, the timelord 205 generates two random tokens, herein referred to as R1, R2. In various embodiments, the random tokens are base64. In an example embodiment, R1 is QWJDMDA5 and R2 is MjFBYkMwMDlhZWZmZmY=. In an embodiment, the random tokens R1,R2 may be added to instance configuration information and stored in the configurations database 204. The random tokens (R1, R2) are transmitted to external element 116 (202). These tokens will be used as a routing mechanism by the firewall to differentiate real attack traffic from the timelord generated traffic.

The firewall policies database 206 is repository system that stores multiple current firewall policies (each firewall policy represented as 206i of the multiple firewall policies) for the web application 104 by unique instance of web application 104. In various embodiments, the firewall policies database 206 is managed by an external element, such as the CI/CD system, and this management is out of scope of the invention.

At the external element 116, responsive to receiving the random tokens, an updated policy ok signal is generated and transmitted at 212, as a function of the random tokens. In more detail, to achieve 212, the external element 116 creates an updated firewall policy that includes the random tokens (R1, R2) and a change in firewall policy 206i that was stored in a firewall policies database 206. Responsive to creating the updated firewall policy, the external element 116 (e.g., the CI/CD system 207) pushes (at 208) the updated firewall policy to one or more cloud providers 102. And, in various embodiments, responsive to receiving the updated firewall policy, the firewall 118 updates the firewall policy accordingly, and notifies the external element 116 that the firewall policy has been updated (at 210). Responsive to receiving the notification from the firewall 118 indicating completion of the firewall policy update, the external element 116 transmits the updated policy ok signal 212 to the timelord module 205 in the firewall verification server 114.

At the timelord module 205, responsive to receiving the updated policy ok signal 212, the timelord module 205 begins loading HTTP attacks at 214. The HTTP attacks include a respective expected response of either forbidden/blocked or accepted. An HTTP attack that is expected to be forbidden is an unacceptable HTTP request to the cloud provider 102, and an HTTP attack that is expected to be accepted is an HTTP request to the cloud provider 102 that is acceptable. The HTTP attack incorporates the random tokens (R1, R2). In various embodiments, the HTTP attack stored on the firewall test data database 220 includes information associating the specific HTTP attack with a unique instance of the web application 104. In some embodiments, the timelord module 205 may reference the configurations database 214 to determine which instance of the web application 104 is being run on the cloud provider 102. In various embodiments, the random tokens (R1, R2) are incorporated by the timelord module 205 into the test data in the form of a header key value parameter for the HTTP attack.

In various embodiments, responsive to receiving the updated policy ok signal 212, the timelord module 205 also loads HTTP attacks (with respective expected responses) that are labeled for the specific web application 104 instance. This is because different services (such as cloud provider 102) can have different protections and firewall rules/policies.

In an example, a new header can be as follows.
GET/index.php?parameter=/bin/bash HTTP/1.1
Host: bwapp.kwaf-demo.test
Accept-Encoding: identity
QWJDMDA5: MjFBYkMwMDlhZWZmZmY=←----- Random tokens
User-Agent: python-urllib3/1.26.2

At task 214, the timelord module 205 loads a first HTTP attack by pulling it from the firewall test data database 220. The firewall test data database 220 is a repository having stored therein a plurality of HTTP attacks, which include multiple malicious (unacceptable) HTTP requests, each with an expected response, which is forbidden or blocked; and multiple valid HTTP requests, each with an expected response, which is pass. The inclusion of the multiple valid HTTP requests enables a robust false-positive management. In an example embodiment, the expected response to a valid HTTP request may be "200" if found, or "404" if not found, and the expected response to an unacceptable HTTP request, such as one containing some structured query language (sql) injected in it, may be "403," or any other pre-programmed response that means "blocked."

In an example, the timelord module 205 performs the task of loading a first HTTP attack and a first expected response that is either forbidden or accepted, the first HTTP attack including the random tokens in a form of a header key value parameter. The timelord module 205 verifies the firewall by performing the tasks of sending the first HTTP attack to the firewall (216) and comparing a response (218) from the firewall 118 of the cloud provider 102 to the first expected response. This example is a single verification step.

The timelord module 205 cycles through the HTTP attack data stored in the firewall test data database 220, as indicated by the dashed line box 250 enclosing various HTTP attacks. Wherein the first HTTP attack and the first expected response define a first test data of a plurality of test data, the timelord module 205 will begin with a first test data, then increment the test data and repeat, until all the HTTP attacks have been sent. At the end of sending the HTTP attacks and comparing the responses to the expected responses, the system and method have performed a full verification.

As those with skill in the art will appreciate, the firewall 118 will process the received HTTP request and verify that there is a policy to process the HTTP request, based on the firewall policy update what was pushed to it at 208. The firewall 118 will execute all the policies and protections that it has received and respond accordingly (send a forbidden/block code, or pass). In various embodiments, the information generated by the firewall 118 will be logged on the system but labeled as testing attacks. The firewall 118 will respond to the timelord 205 in the firewall verification server 114 with some HTTP response code.

In an example, a response may be as follows.
HTTP/1.1 403 Forbidden
content-type: text/html; charset=UTF-8
content-length: 218
date: Wed, 1 Sep. 2021 08:00:22 GMT
server: istio-envoy
x-envoy-upstream-service-time: 0

After each HTTP attack is sent, the timelord module 205 compares the received HTTP response code (shortened to "response" herein) from the firewall 118 to the expected response for the HTTP attack that was sent, to determine if the response was expected. Based thereon, in various embodiments, the timelord module 205 may send a status of the first HTTP attack to the external element 116 when the response from the firewall 118 to the first HTTP attack is received.

In various embodiments, the timelord module 205 additionally store each status (i.e., each response from the firewall 118) in a status report. In various embodiments, upon completion of sending all the HTTP attacks in the firewall test data database 220, the timelord module 205 may cause the external element 116 to delete the random tokens by transmiting a command, such as, "delete random tokens" 228 to the external element 116. In various embodiments, upon completion of sending all the HTTP attacks, the timelord module 205 may send a compiled verification status report 230 that reflects the plurality of HTTP attacks and firewall 118 response to an external element 116, such as a report system 222.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions) that may embody an algorithm or rules. Instructions may be executed by hardware to perform operations. Executing software includes executing code, which includes executing instructions. The execution of a program to perform a task involves executing some or all the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a processor to perform operations when the instructions are executed by the processor. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

As mentioned, the term "user" refers to an entity (e.g., an individual person) that uses an electronic device. Software and/or services may use credentials to distinguish different accounts associated with the same and/or different users. Users can have one or more roles, and the software may enable distinctly different operating capabilities for a user, based on the user's role. Examples of roles that a user may have include an administrator, a programmer/developer, and an end user. As an administrator, a user typically uses electronic devices to administer them for other users, and thus an administrator often works directly and/or indirectly with server devices and client devices.

Figure 3A:
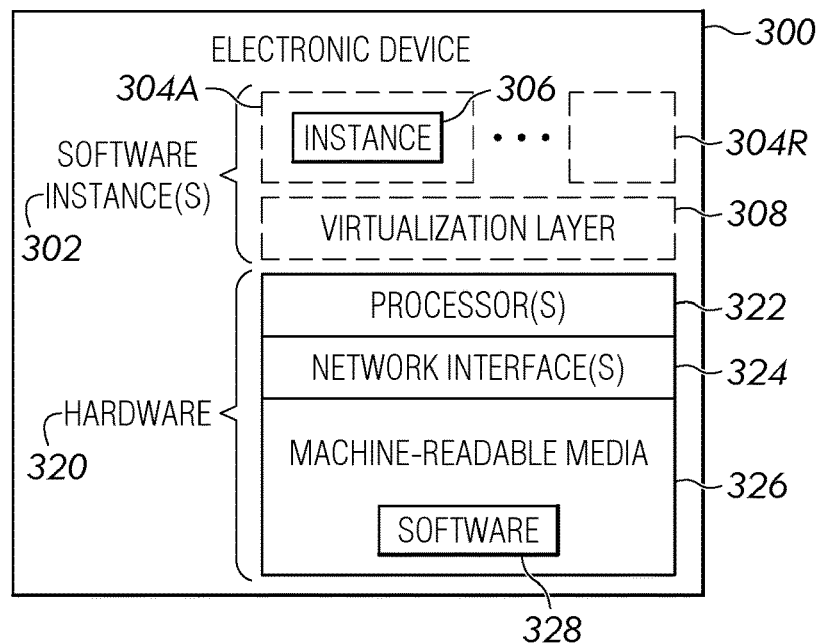
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and the firewall verification service may be implemented in one or more electronic devices 300. In one implementation: 1) each of the clients is implemented in a separate one of the electronic devices 300 (e.g., in end user devices where the software 328 represents the software to implement clients to interface directly and/or indirectly with the firewall verification service (e.g., software 328 represents a web browser, a native client, a portal, a command-line interface, and/or an application programming interface (API) based upon protocols such as Simple Object Access Protocol (SOAP), Representational State Transfer (REST), etc.)); 2) the firewall verification service is implemented in a separate set of one or more of the electronic devices 300 (e.g., a set of one or more server devices where the software 328 represents the software to implement the firewall verification service); and 3) in operation, the electronic devices implementing the clients and the firewall verification service would be communicatively coupled (e.g., by a network) and would establish between them (or through one or more other layers and/or or other services) connections for submitting queries and edits for recurring donations information for a donor to the firewall verification service and returning a recurrence schedule formatted for display in accordance with a predetermined visualization scheme to the clients. Other configurations of electronic devices may be used in other implementations (e.g., an implementation in which the client and the firewall verification service are implemented on a single electronic device 300).

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Figure 3B:
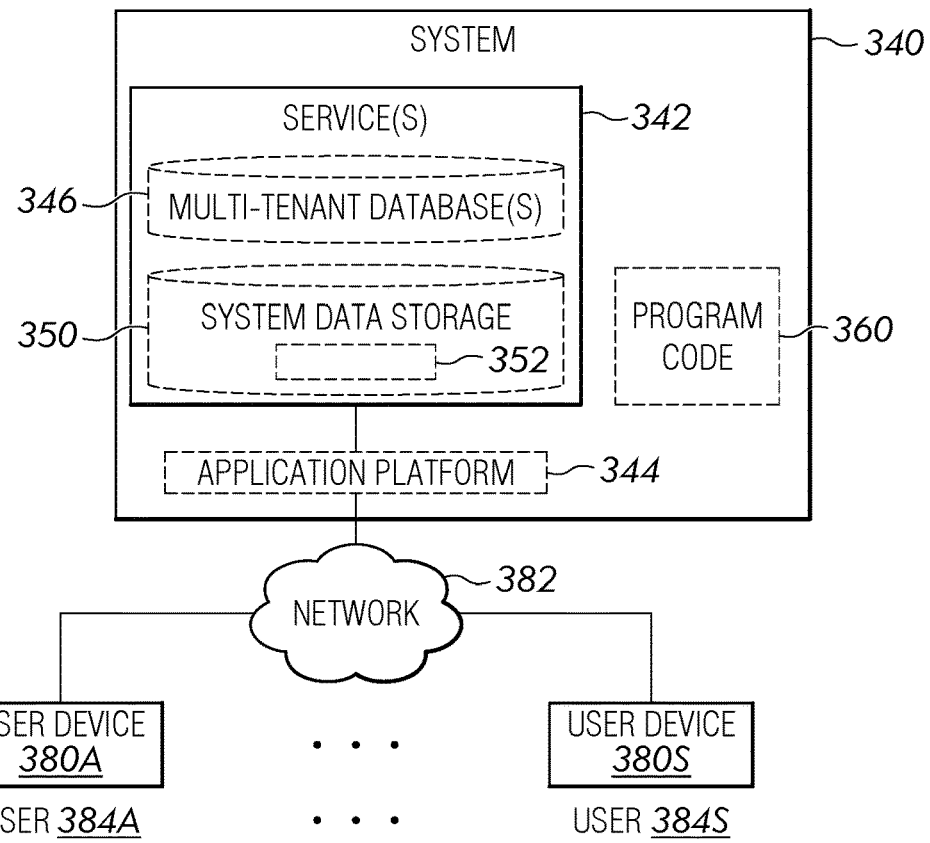
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including firewall verification service. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third-party application developers providing applications/services and another set of tenants may be customers of different ones or all the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM), including Non-Profit donor management; Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the Firewall verification service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages, and applications available to it from system 340 over network 382.

In the above description, numerous specific details such as resource partitioning/sharing/duplication implementations, types and interrelationships of system components, and logic partitioning/integration choices are set forth to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating sequence diagrams and flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A system that provides verification of a firewall, comprising:
a timelord module executed on a processor and in operable communication with the firewall and configured to:
transmit random tokens to an external element responsive to a schedule task;
receive an updated policy ok signal from the external element, wherein the external element includes a processing system and a memory that stores programming instructions for execution by the processing system to: create an updated firewall policy that includes the random tokens and a change in a firewall policy, push the updated firewall policy to the firewall, and transmit the updated policy ok signal responsive to receiving a notification from the firewall;
respond to the updated policy ok signal by:
loading a first Hypertext Transfer Protocol (HTTP) attack from among a plurality of HTTP attacks, the first HTTP attack including a first expected response that is either forbidden or accepted and the random tokens in a form of a header key value parameter;
sending the first HTTP attack to the firewall;
comparing a response from the firewall to the first HTTP attack with the first expected response;
incrementing the first HTTP attack and repeating the loading, sending, and comparing until the plurality of HTTP attacks have been sent; and
delete the random tokens when the plurality of HTTP attacks have been sent.

2. The system of claim 1, further comprising:
a configurations database operationally coupled to the timelord module and having stored therein a preprogrammed schedule that controls the schedule task.

3. The system of claim 1, wherein the timelord module is further configured to send a status to the external element when the response from the firewall to the first HTTP attack is received.

4. The system of claim 3, wherein the timelord module is further configured to store the response from the firewall to the first HTTP attack in a status report.

5. The system of claim 1, wherein the timelord module further configured to send to the external element, upon completion of the plurality of HTTP attacks, a status report including the plurality of HTTP attacks, each with a respective firewall response.

6. The system of claim 1, wherein the timelord module is further configured to respond to the updated policy ok signal by additionally loading HTTP attacks that are labeled for a specific web application instance running on a cloud provider.

7. A processor-implemented method for verifying a firewall, comprising:
transmitting, by a timelord module, random tokens to an external element responsive to a schedule task;
creating, by the external element, an updated firewall policy that includes the random tokens and a change in a firewall policy;
pushing, by the external element, the updated firewall policy to the firewall;
transmit, by the external element, an updated policy ok signal to the timelord module responsive to receiving a notification from the firewall;
receiving, by the timelord module, the updated policy ok signal from the external element;
responding, by the timelord module, to the updated policy ok signal by:
loading a first Hypertext Transfer Protocol (HTTP) attack with a first expected response that is either forbidden or accepted, the first HTTP attack including the random tokens in a form of a header key value parameter;
sending the first HTTP attack to the firewall;
comparing a response from the firewall to the first HTTP attack with the first expected response;
incrementing the first HTTP attack and repeating the loading, sending, and comparing until a plurality of HTTP attacks have been sent; and
deleting the random tokens after the plurality of HTTP attacks have been sent.

8. The processor-implemented method of claim 7, further comprising, sending, by the timelord module, a status of the first HTTP attack to the external element when the response from the firewall to the first HTTP attack is received.

9. The processor-implemented method of claim 8, further comprising:
storing, by the timelord module, the status from the firewall to the first HTTP attack in a status report.

10. The processor-implemented method of claim 9, further comprising, upon completion of the plurality of HTTP attacks, transmitting, by timelord module, the status report to the external element.

11. The processor-implemented method of claim 7, further comprising, responding, by the timelord module, to the updated policy ok signal by additionally loading HTTP attacks that are labeled for a specific web application instance.

12. At least one non-transitory computer-readable medium containing instructions thereon, which, when executed by at least one processor, are configured to perform a method comprising:
transmitting, by a timelord module, random tokens to an external element responsive to a schedule task, wherein the external element is configured to create an updated firewall policy that includes the random tokens and a change in a firewall policy, push the updated firewall policy to the firewall, and transmit an updated policy ok signal to the timelord module responsive to receiving a notification from the firewall;
receiving, by the timelord module, the updated policy ok signal;
responding by the timelord module, to the updated policy ok signal by:
loading a first Hypertext Transfer Protocol (HTTP) attack with a first expected response that is either forbidden or accepted, the first HTTP attack including the random tokens in a form of a header key value parameter;

sending the first HTTP attack to the firewall;
comparing a response from the firewall to the first HTTP attack with the first expected response;
incrementing the first HTTP attack and repeating the loading, sending, and comparing until a plurality of HTTP attacks have been sent; and
deleting the random tokens after the plurality of HTTP attacks have been sent.

13. The at least one non-transitory computer-readable medium of claim 12, wherein the method further comprises:
sending, by the timelord module, a status report to the external element when the response from the firewall to the first HTTP attack is received.

14. The at least one non-transitory computer-readable medium of claim 12, wherein the method further comprises:
responding, by the timelord module, to the updated policy ok signal by additionally loading HTTP attacks that are labeled for a specific web application instance.

15. The at least one non-transitory computer-readable medium of claim 12, wherein the method further comprises:
sending, by the timelord module, a compiled status report that reflects the plurality of HTTP attacks and respective firewall responses to the external element, upon completion of the plurality of HTTP attacks.

\* \* \* \* \*